(12) United States Patent
Zhang et al.

(10) Patent No.: US 8,308,840 B2
(45) Date of Patent: Nov. 13, 2012

(54) CONTINUOUS METHOD AND PRODUCTION DEVICE FOR PRODUCING HYDROLYSIS-RESISTANT STABLE IONIC TITANIUM

(75) Inventors: Xiaohui Zhang, Tianjin (CN); Chenkai Shang, Tianjin (CN); Shaojian Xiao, Tianjin (CN)

(73) Assignee: Xiaohui Zhang, Tianjin (CN)

( * ) Notice: Subject to any disclaimer, the term of this patent is extended or adjusted under 35 U.S.C. 154(b) by 0 days.

(21) Appl. No.: 13/256,258

(22) PCT Filed: Sep. 21, 2009

(86) PCT No.: PCT/CN2009/001059
§ 371 (c)(1),
(2), (4) Date: Sep. 13, 2011

(87) PCT Pub. No.: WO2011/032305
PCT Pub. Date: Mar. 24, 2011

(65) Prior Publication Data
US 2012/0111074 A1 May 10, 2012

(30) Foreign Application Priority Data
Sep. 16, 2009 (CN) .......................... 2009 1 0070453

(51) Int. Cl.
*C05B 11/00* (2006.01)
(52) U.S. Cl. ............... 71/31; 71/32; 422/119; 422/129; 422/224
(58) Field of Classification Search ............. 71/31, 32; 422/119, 129, 224
See application file for complete search history.

(56) References Cited

FOREIGN PATENT DOCUMENTS

| | | | |
|---|---|---|---|
| CN | 85107690 | * | 4/1987 |
| CN | 1052302 A | | 6/1991 |
| CS | 8602104 A1 | | 3/1988 |
| GB | 2090585 A | | 7/1982 |
| JP | 62249902 | * | 10/1987 |

OTHER PUBLICATIONS

International Search Report and Written Opinion issued Jun. 17, 2010 in corresponding PCT Application PCT/CN2009/001059.

* cited by examiner

*Primary Examiner* — Steven Bos
(74) *Attorney, Agent, or Firm* — Pearne & Gordon LLP

(57) ABSTRACT

A continuous method and a production device for producing hydrolysis-resistant stable ionic titanium ($Ti^{4+}$) are provided. The method comprises six steps: (i) carrying out a redox reaction between metal titanium and excess strong acid; (ii) carrying out primary chelation; (iii) diluting; (iv) adjusting pH value for the first time; (v) carrying out secondary chelation; and (vi) adding microelement and adjusting pH value for a second time. The device includes a reaction kettle, multiple metering pumps, a chelation kettle, dilution tank, multiple precise mixing reaction kettles, a first chelator storage tank, a pure water storage tank, an alkali liquor storage tank, a second chelator storage tank, multiple microelements storage tanks, a control center, etc. The method uses a multi-point, spiral, reverse and atomization spraying technique synchronously to carry out digital fully automatic continuous production and reach the effect of elaborately mixing the material. Also, the method greatly shortens the inter-dissolving time of the materials, easily controls the pH of the solution, and improves the stability of the product.

10 Claims, 2 Drawing Sheets

CONTINUOUS METHOD AND PRODUCTION DEVICE FOR PRODUCING HYDROLYSIS-RESISTANT STABLE IONIC TITANIUM

TECHNICAL FIELD

The invention relates to a continuous method and production device for producing hydrolysis-resistant stable ionic titanium. Specifically, it relates to a digital automatic production line and a fine mixing device with multipoint, spiral, reversal and atomization spraying technology.

BACKGROUND ART

The effect of Titanium (Ti) on agriculture is remarkable; it can prompt the growth of crops and plant seedlings, and enhance root systems. Titanium can also improve the quality of fruits such as by increasing fruits' protein, vitamin C and soluble sugar content, increasing crop and plant resistance to drought, drowning, freezing, heat and disease, reducing pesticide residue, and improving a plant's ability to absorb fertilizer. In addition, Titanium can fundamentally improve utilization of chlorophyll, strengthening photosynthesis and improving enzyme activity in plants. Therefore, Ti is a beneficial element to plant growth and prospects for its application are very bright.

Ti is a kind of chemical element which widely exists in the natural world and its occupation in the earth's crust is about 0.6%; the content of Ti in the soil is about 1~20 g/kg and the average is 6.8 g/kg. However, because Ti generally exists in an insoluble state, there is little Ti which can be collected by plants.

In order to have Ti easily absorbed by plants, it is necessary to provide soluble, long-term stable and non-sedimentary Ti products.

It is very difficult to produce a Ti formulation like this; Ti can stably exist in the form of $TiO_2$ and the products of titanium with acidic moieties. Titanium salt solution is very unstable and it can only exist in a solution with high acidity; Titanium salt solution will hydrolyze when the pH is higher than 0.5. It is difficult for plants to absorb $TiO_2$, however ionic Ti existing in a salt solution can be very easily absorbed by plants. Ti mainly exists in the form of $Ti^{4+}$ and its solubility is very low. Ti is insoluble in solutions with pH values from 4 to 8. $Ti^{4+}$ has very strong polarity because its electric charge is high and its radius is small, which can make it readily hydrolysable; particularly when the pH value of a solution is very high, $Ti^{4+}$ is very easy to hydrolyze and it becomes a precipitate after its hydrolysis.

SUMMARY OF THE INVENTION

In order to overcome the shortcomings of prior art mentioned above, the present invention provides a continuous method of producing hydrolysis-resistant stable ionic titanium and a device therefor.

A continuous method of producing hydrolysis-resistant stable ionic titanium comprises the following steps:

(i) Dissolution Reaction of Titanium

A redox reaction is carried out in a reaction kettle between titanium and an excessive strong acid. The metal titanium is dissolved and a titanium salt solution comprising ionic titanium is produced.

(ii) Primary Chelation

The titanium salt solution and a chelator are put into a chelation kettle via first and second metering pumps for a primary chelation reaction; the molar ratio between the titanium salt solution and the chelator is 1:1.

(iii) Dilution

Purified water in a pure water storage tank is injected into a dilution tank containing the chelated product via a third metering pump in order to dilute the chelated titanium solution. The ionic Ti concentration in the diluted product is up to 40000 ppm and its pressure is 0.2~0.3 Mpa. The diluted product is mixed in a first precise mixing reaction kettle through a fourth metering pump.

(iv) Adjustment of pH Value for the First Time

Alkaline liquor is fed through a fifth metering pump from an alkaline liquor tank to the first precise mixing reaction kettle containing the diluted product. A fine mixture is produced by using multipoint, spiral, reversal and atomization spraying techniques in the reaction kettle; the pH value is between 2.5~3 and the pressure is between 0.2~0.3 Mpa and the normality of the alkaline liquor is between 2~4N (molarity is between 2~4M). The fine mixed material is transferred into a second precise mixing reaction kettle through a pipeline.

(v) The Second Chelation Reaction

Through a sixth metering pump, a second chelator is transferred from a second chelator storage tank to the second precise mixing reaction kettle to carry out a second chelation reaction with the product after the first adjustment of pH value; the pH value of the product is controlled in the range of 3.0±0.1 and the pressure of the second precise mixing reaction kettle is between 0.2±0.3 Mpa. The product after the second chelation reaction is transferred to a third precise mixing reaction kettle through a pipeline.

(vi) Adding Microelements and the Second Adjustment of pH Value

A microelement solution is transferred from a microelement storage tank into the third precise mixing reaction kettle via a seventh metering pump. Alkaline liquor is transferred by an eighth metering pump from the alkaline liquor tank to the third precise mixing reaction kettle to make a third fine mixture with the product after the second chelation reaction. The alkaline liquor is used to adjust pH value, the pressure in the third precise mixing reaction kettle is 0.2~0.3 Mpa; the normality of the alkaline liquor is between 2~4N (molarity is between 2~4 M); the final product is stored in a product tank. The pH value of the final product is in the range of 3.0±0.1. The concentration of ionic titanium ($Ti^{+4}$) is 4000 ppm.

The strong acid may be hydrochloric, nitric acid or sulfuric acid. The chelator may be selected from the hydroxy organic compounds or carboxyl organic compounds, such as citric acid, oxalic acid, ascorbic acid or EDTA. The microelements may be one or more microelements selected from the 16 microelements stipulated the by Ministry of Agriculture of China, such as Cu, Fe, Mn, Zn, P and Mo. The added amounts of the microelements is controlled to be no more than 10% in total by weight.

A production device for producing hydrolysis-resistant stable ionic titanium by a continuous method is provided in which all reactions in the production line are continuous, and the materials react in order when flowing. All the reaction procedures are monitored in real-time by a control center. The final product can be made ceaselessly. The production device includes the following devices which are connected by a pipeline in order: reaction kettle, first metering pump, chelation kettle, dilution tank, fourth metering pump and first precise mixing reaction kettle; first chelator storage tank, second metering pump and the chelation kettle. A storage tank of purified water, third metering pump and dilution tank are connected in order; a second chelator storage tank, sixth metering pump and second precise mixing reaction kettle are connected in order; a storage tank of microelements, seventh metering pump, and third precise mixing reaction kettle are connected in order; an alkali liquor tank is respectively connected with the fifth and eighth metering pumps; the fifth metering pump, first precise mixing reaction kettle, second precise mixing reaction kettle, third precise mixing reaction kettle and eighth metering pump and tank of final product are connected in order.

In the production device, the output ends of the flow transducers of the first, second, third, fifth, sixth, seventh and eighth metering pumps are connected to the flow input end of the control center. The flow output end of the control center is connected with the input ends of the flow transducers of the metering pumps. The output ends for the electrical signals of the material transducers of the reaction kettle, the first chelator storage tank, the storage tank of purified water, the storage tank of alkali liquor, the second chelator storage tank and the storage tank of microelements are connected with the material input end of the control center; the output end of the control center is connected to the input ends of the flow transducers of the material supply pumps of said reaction kettle, the first chelator storage tank, the storage tank of purified water, the storage tank of alkali liquor, the second chelator storage tank and the storage tank of microelements. The output ends of three sensors of pH, temperature and pressure on the chelation kettle, dilution tank and first, second and third precise mixing reaction kettles are connected to the input ends of sensors of pH, temperature and pressure on the control center. The temperature output end of the control center is connected with the temperature sensor input end of a cycling pump for cycling water in a water jacket of the reaction kettle. The output ends of pressure and pH of the control center are connected to the input ends of the flow transducers of the third, fifth and eighth metering pumps.

The control center may be an industrial controlling machine such as model ABVANTCH-610.

The first, second and third precise mixing reaction kettles are each composed of a tank and a lid. A coiled pipe with many equispaced small holes and a stirrer are set inside each tank.

The diameter of the equispaced small holes on the coiled pipe is 1-2 mm. The rotation direction of the stirrer is opposite to the flow direction of the alkali liquor in the coiled pipe.

This invention takes advantage of techniques of multipoint, spiral, reversal and atomization spraying, as well as a digital automatic production line, and achieves the objective of the technical effect of fine mixing the materials. In the present invention, the mixing time of materials is reduced sharply, the pH value is easily controlled and the product stability is improved.

| | |
|---|---|
| 1 | Reaction kettle |
| 2 | First metering pump |
| 3 | Chelation kettle |
| 4 | Dilution tank |
| 5 | Fourth metering pump |
| 6 | First precise mixing reaction kettle |
| 7 | First chelator storage tank |
| 8 | Second metering pump |
| 9 | Storage tank of purified water |
| 10 | Third metering pump |
| 11 | Fifth metering pump |
| 12 | Storage tank of alkali liquor |
| 13 | Second chelator storage tank |
| 14 | Sixth metering pump |
| 15 | Second precise mixing reaction kettle |
| 16 | Storage tank of microelement |
| 17 | Seventh metering pump |
| 18 | Third precise mixing reaction kettle |
| 19 | Eighth metering pump |
| 20 | Control center |
| 21 | Storage tank of final product |
| 30 | Tank |
| 31 | Lid |
| 32 | Coiled pipe |
| 33 | Stirrer |
| 34 | Sealer |
| 35 | Small hole |

BEST MODE OF CARRYING OUT THE INVENTION

In the following paragraphs, a detailed description of a continuous method of producing hydrolysis-resistant stable ionic titanium and a device therefor are given in reference to the attached drawings and examples.

Figure 1:
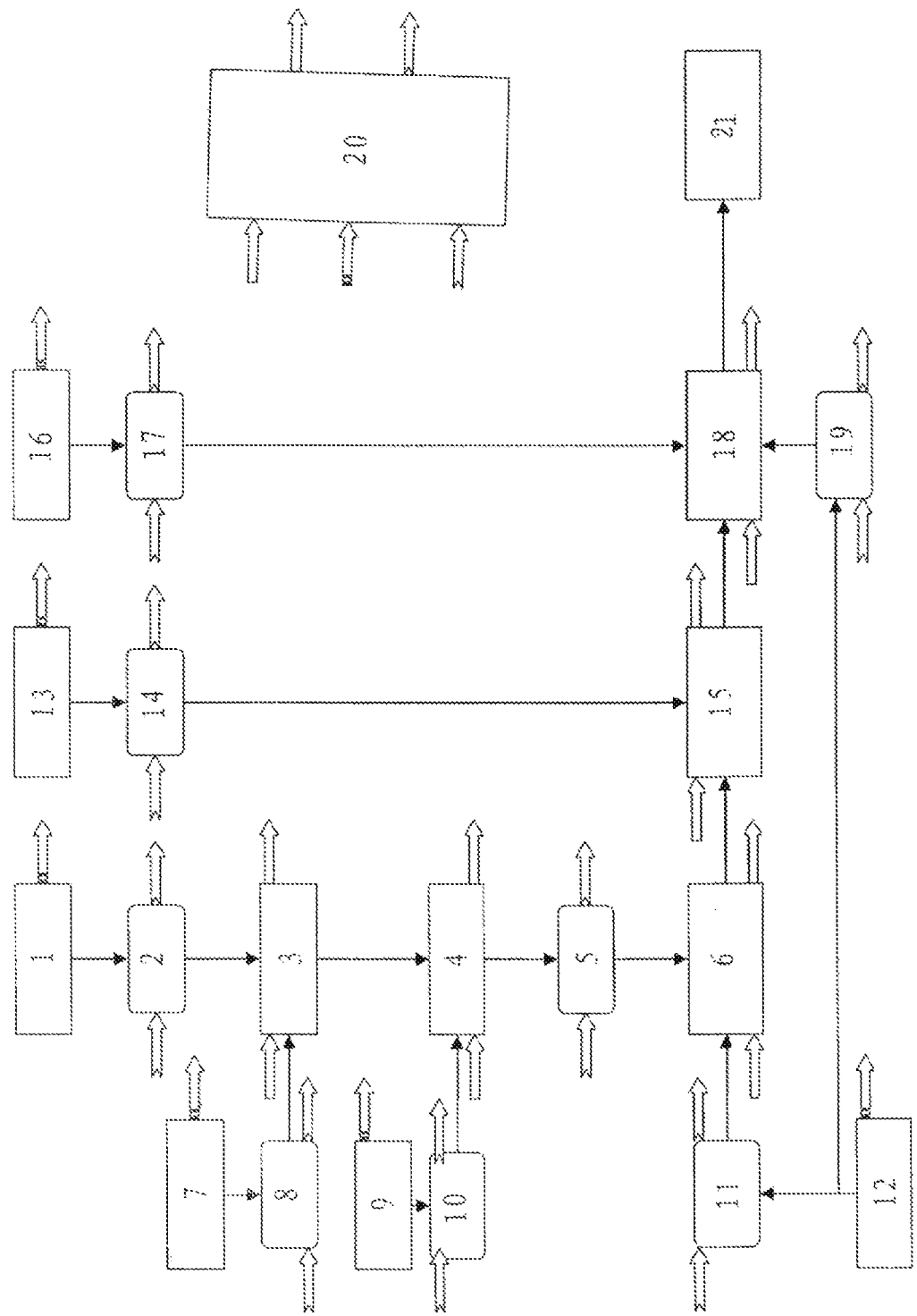
FIG. 1 shows flow diagrams of a continuous method of producing hydrolysis-resistant stable ionic titanium and a device therefor of the present application.

Referring to FIG. 1, a continuous method of producing hydrolysis-resistant stable ionic titanium comprises the following steps:

(i) Dissolution Reaction of Ti

Titanium salt solution can only exist in a solution with high acidity. Once the pH value of a titanium salt solution is higher than 0.5, it will hydrolyze. Therefore, a strong acid is used to produce a titanium salt solution. A redox reaction between metallic titanium and an excessive strong acid (one of hydrochloric, nitric acid or sulfuric acid) is done in a reaction kettle (1), in which the titanium salt is dissolved and then a titanium salt solution is produced. The duty ratio of solution in the reactor should be controlled in the range of 30%~90%. The titanium salt solution is injected into a chelation kettle (3) by a first metering pump (2).

(ii) Primary Chelation Reaction

A solution with strong acidity is not a suitable product for crops. In order to make the titanium salt solution still stable with a high pH value, hydroxy and carboxyl organic compounds are used as a chelator to chelate Ti. A chelator in a first chelator storage tank (7) is transferred to the chelation kettle (3) by a second metering pump (8) to carry out a primary chelation reaction; the molar ratio between the titanium salt solution and the chelator is 1:1 and the chelation kettle is under normal temperature and ordinary pressure.

The chelator may be one of citric acid, oxalic acid, ascorbic acid or EDTA; then the chelated product is transferred to a dilution tank (4).

(iii) Dilution

Purified water in a storage tank (9) is injected into a dilution tank (4) containing the chelated product via a third metering pump (10); the concentration of ionic Ti in the materials is diluted to 40,000 ppm. The pressure in the dilution tank is 0.2~0.3 Mpa, the temperature in the dilution is room temperature. The diluted product is mixed in a first precise mixing reaction kettle (6) by a fourth metering pump (5).

(iv) The First Adjustment for pH Value

In order to avoid high pH values in certain areas of the product, this procedure adopts the techniques of creating a fine mixture by multipoint, spiral, reversal and atomization spraying. An alkaline liquor is fed through a fifth metering pump (11) from an alkaline liquor tank (12) to the first precise mixing reaction kettle (6), and makes a fine mixture through multipoint, spiral, reversal and atomization spraying in the reaction kettle, in which the pH value is between 2.5~3.0. The normality of the alkaline liquor is between 2~4N (molarity is between 2~4M). The fine mixed product is transferred into a second precise mixing reaction kettle (15) via a pipeline.

(v) The Second Chelation Reaction

Due to the increase of pH value during the process of dilution and adding alkali, chelation is further done in order to make the ionic Ti stable. Through a sixth metering pump (14), a chelator is transferred from a second chelator storage tank to the second precise mixing reaction kettle (15) to make a second chelation reaction after the first adjustment of pH value of the product; the pH value of the product is controlled in the range of 3.0±0.1 and the pressure of the kettle (15) is between 0.2±0.3 Mpa; the product after the second chelation reaction is transferred into a third precise mixing reaction kettle (18) via a pipeline.

(vi) Adding Microelements and the Second Adjustment of pH Value Different crops need different microelements. The microelements are transferred from a microelement storage tank into the third precise mixing reaction kettle (18) via a seventh metering pump (17) in the form of a solution; and alkaline liquor is transferred by an eighth metering pump (19) from the alkaline liquor tank (12) to the third precise mixing reaction kettle (18) to make a fine mixture with the product after the second chelation reaction. The diluted alkaline liquor adjusts pH value within 3.0±0.1, the pressure in the kettle (18) is 0.2~0.3 Mpa; the normality of the alkaline liquor is between 2~4N (molarity is between 2~4M). The microelements are added to a series of products as adjuvant. There are 16 types of microelements, six of which are used often, i.e. Cu, Fe, Mn, Zn, P and Mo. The added amounts of the microelements are controlled to be no more than 10% in total by weight.

The final product with hydrolysis-resistant stable ionic titanium is stored in a product tank (25), and its pH value is controlled in the range of 3.0±0.1, and the concentration of ionic titanium is 40,000 ppm.

Referring to FIG. 1, a production device for producing hydrolysis-resistant stable ionic titanium by a continuous method is provided. All reactions in the production line are continuous, and the materials react in order when flowing. All the reaction procedures are monitored in real-time by a control center and the final product can be made ceaselessly. The production device includes the following devices which are connected by a pipeline in order: reaction kettle (1), first metering pump (2), chelation kettle (3), dilution tank (4), fourth metering pump (5) and first precise mixing reaction kettle (6); the first chelator storage tank (7), second metering pump (8) and chelation kettle (3) are also connected in-line along a parallel fluid path. The storage tank of purified water (9), third metering pump (10) and dilution tank (4) are connected in order along a further parallel fluid path. The second chelator storage tank (13), sixth metering pump (14) and second precise mixing reaction kettle (15) are connected in order. The storage tank of microelements (16), seventh metering pump (17), and third precise mixing reaction kettle (18) are connected in order; the alkali liquor tank (12) is respectively connected with the fifth and eighth metering pumps (11) and (19); the fifth metering pump (11), first precise mixing reaction kettle (6), second precise mixing reaction kettle (15), third precise mixing reaction kettle (18) and eighth metering pump (19) and tank of final product (21) are connected in order.

The connections of the above parts are the flow channels of the products and are shown by arrows "⟶" in FIG. 1.

The output ends of the flow transducers of the first, second, third, fifth, sixth, seventh and eighth metering pumps (2, 8, 10, 11, 14, 17, 19) are connected with the flow input end of the control center (20). The control signal for the flow output end of the control center (20) is connected with the input ends of the flow transducers of the above mentioned metering pumps.

Product transducers (not shown) will be set on the reaction kettle (1), the first chelator storage tank (7), the storage tank (9) of purified water, the alkali liquor tank (12), the second chelator storage tank (13) and the microelement storage tank (16), respectively. The product transducers transfer the product signals detected in the containers to the material input end of the control center (20). The annunciator of the control center processes the data, and the command signal of the processing result is respectively passed to the signal input of the flow transducer of each material supply pump (not shown) to adjust the flow of each replenishment pump to make sure the amount of material in each container is in the set range. Namely, the duty ratio between the existing solution in the container and given solution is 30%~90%; once it exceeds this range, the control center will send an alarm and it will automatically adjust the flow of the replenishment pump to make the material to be in the given range.

There are three kinds of transducers (not shown), namely pressure, temperature and pH value transducers, respectively being set on the chelating reactor (3), the dilution tank (4), and the first, second and third precise mixing reaction kettles (6, 15, 18); the transducers transfer the electrical signals of the pressure, temperature and pH values detected in each container to the output end of the control center (20). The control center processes the electrical signals of the pressure, temperature and pH values to adjust the pressure, temperature and pH values. The signals are transferred to the power output end of a circulator (not shown) for circulating water in the reaction kettle's water jacket to adjust the water flow of the circulator to make it reach the controlled temperature. When the pressure is lower than 0.2 Mpa or is higher than 0.3 Mpa, the system can automatically give alarm and stop the whole production line. The demand signal used to deal with the result will be respectively transferred to the output ends of the third, fifth and eighth metering pumps (10, 11, 19) to change the flow of the pumps; thus the pH value can be adjusted. Comparing the present pH value, pressure, and temperature with the set values, once they exceed the set values, the control center will give alarm and it will automatically adjust the flow of the metering pumps to make the PH value, pressure and temperature be in the given scale.

The chelating process, the process of adjusting pH value, the process of adding microelements and the process of purified water dilution all affect the concentration of ionic titanium. The control center makes real-time detection of the titanium concentration at the second, third, fifth, sixth, seventh and eighth metering pumps (8, 10, 11, 14, 17, 19); the control center makes appropriate synthesis computations to determine appropriate control parameters, and transfers the electrical signals of the concentration computation result to the power output end of the third metering pump (10) to adjust the flow of the metering pump to control the concentration of ionic titanium in the given scale.

In FIG. 1, ⇒represents electrical signals of pressure, temperature and pH values; ⇒represents electrical signals of the amount of material; ⇒represents the electrical signals of the flow.

The control center is an industrial controlling machine, e.g. model is ABVANTCH-610.

There are many sets of storage tanks (16) of microelements and their corresponding metering pumps (17), third precise mixing reaction kettles (18) and metering pumps (19); one or more sets of them could be used based on the customers' microelement requirements.

Figure 2:
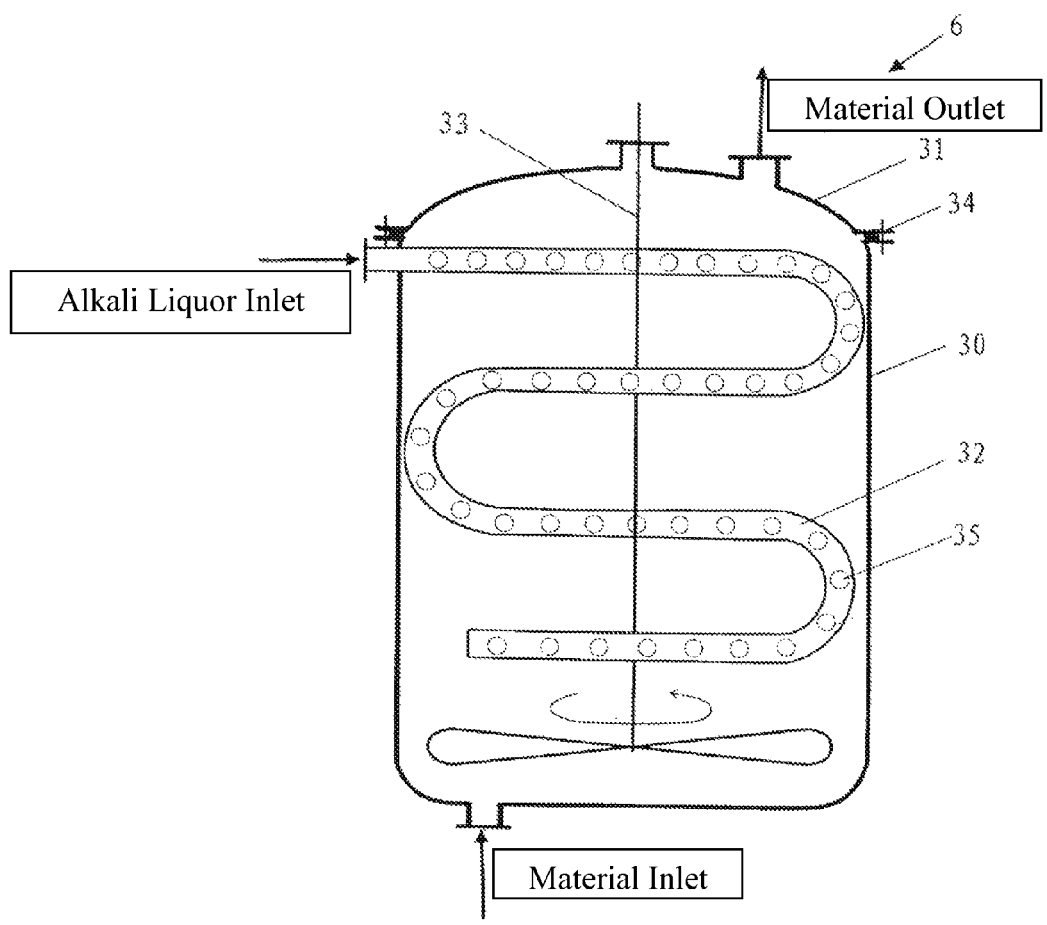
FIG. 2 is a structural diagram of a precise mixing reaction kettle.

Referring to FIG. 2, the first precise mixing reaction kettle (6) consists of a tank (30) and a lid (31); there is a seal packing (34) which is fixed by a bolt between the tank and the lid. A coiled pipe (32) with many equispaced small holes (35) and a stirrer (33) are set inside the tank (30). The diameter of the equispaced small holes on the coiled pipe is 1~2 mm. The stirrer 33 is driven by an engine (not shown); the rotation direction of the stirrer is opposite to the flow direction of the alkali liquor in the coiled pipe. The flow direction of the material in the tank is from bottom to top and the direction of alkali liquor is from top to bottom in operation. The alkali liquor is sprayed and flows through many small holes and the stirrer stirs ceaselessly. Thus, the material and alkali liquor in the tank undergo multipoint, spiral, reversal and atomization spraying to prevent localized high pH value and achieve the effect of fine mixture.

The structures of the second and third precise mixing reaction kettles (15, 18) are completely the same as the first precise mixing reaction kettle (6).

This invention adopts a digital automatic production line, and also applies techniques of multipoint, spiral, reversal and atomization spraying, therefore the final products reach the state of a fine mixture, the mixing time is reduced greatly, the pH value is easy to control and product stability is improved.

The invention claimed is:

1. A continuous method of producing hydrolysis-resistant stable ionic titanium, comprising the following steps:
   (i) a redox reaction between titanium and an excessive strong acid is carried out, said titanium is dissolved and a titanium salt solution comprising ionic titanium is produced;
   (ii) said titanium salt solution and a first chelator undergo a primary chelation reaction to create a chelated product; the molar ratio between titanium salt solution and chelator being 1:1 in said chelated product;
   (iii) purified water is injected into the chelated product to create a diluted product; the ionic titanium concentration in the diluted product being diluted to 40,000 ppm and its pressure maintained or adjusted to 0.2~0.3 Mpa;
   (iv) an alkaline liquor is mixed with said diluted product to produce an intermediate fine mixed material having a pH value of 2.5~3 and a pressure of 0.2~0.3 Mpa, wherein the normality of the alkaline liquor is 2~4N;
   (v) said intermediate fine mixed material and a second chelator undergo a second chelation reaction to produce a secondary chelated product; wherein the pH value of the secondary chelated product is controlled in the range of 3.0±0.1 and the pressure thereof is 0.2~0.3 Mpa; and
   (vi) combining a microelement solution and an alkaline liquor with said secondary chelated product to make a final fine mixture comprising hydrolysis-resistant stable ionic titanium.

2. The method of claim 1, wherein said strong acid is hydrochloric acid, nitric acid or sulfuric acid.

3. The method of claim 1, wherein the first and second chelators each is a hydroxy organic compound or carboxyl organic compound.

4. The method of claim 1, wherein said microelement comprises one or more of Cu, Fe, Mn, Zn, P and Mo, wherein the total amount of microelements added is no more than 10% by weight.

5. The method of claim 3, where in the carboxyl organic compound is citric acid, oxalic acid, ascorbic acid or EDTA.

6. A device for use in carrying out the method of claim 1, comprising;
   the following parts which are connected in order: a reaction kettle, first metering pump, chelation reactor, dilution tank, fourth metering pump, first precise mixing reaction kettle;
   the following parts which are connected in order: first chelator storage tank, second metering pump and said chelation reactor;
   the following parts which are connected in order: storage tank of purified water, third metering pump and said dilution tank;
   the following parts which are connected in order: second chelator storage tank, sixth metering pump and second precise mixing reaction kettle;
   the following parts which are connected in order: storage tank of microelements, seventh metering pump and third precise mixing reaction kettle;
   an alkali liquor tank connected with the fifth and eighth metering pumps;
   the following parts which are connected in order: the fifth metering pump, said first precise mixing reaction kettle, said second precise mixing reaction kettle, said third precise mixing reaction kettle, and said tank of final product are connected in order;
   wherein a control center is operatively connected to each of the following for controlling the same in operation of said device:
   the first, second, third, fifth, sixth, seventh and eighth metering pumps;
   respective material transducers for each the following: of the reaction kettle, the first chelator storage tank of, the storage tank of purified water, the alkali liquor tank, the second chelator storage tank and the tank of microelements;
   respective material replenishment pumps of the first chelator storage tank, the storage tank of purified water, the alkali liquor tank, the second chelator storage tank and the tank of microelements; and
   respective pressure, temperature and pH-value transducers of the chelation reactor, the dilution tank, and the first, second and third precise mixing reaction kettles;
   wherein a temperature output control signal of the control center is connected with a circulator of the reaction kettle, pressure and pH control signals of the control center are connected with said third, fifth and eighth metering pumps.

7. The device of claim 6, wherein the control center is an industrial controlling machine.

8. The device of claim 6, wherein each precise mixing reaction kettle is composed of a tank and lid; a coiled pipe with many equispaced mini holes is inside the tank and a stirrer is connected at the bottom of the tank.

9. The device of claim 8, wherein the diameter of the equispaced mini holes on the coiled pipe is 1~2 mm.

10. The device of claim 8, wherein the rotation direction of the stirrer is opposite to the flow direction of alkali liquor in the coiled pipe.

* * * * *

UNITED STATES PATENT AND TRADEMARK OFFICE
CERTIFICATE OF CORRECTION

PATENT NO. : 8,308,840 B2
APPLICATION NO. : 13/256258
DATED : November 13, 2012
INVENTOR(S) : Xiaohui Zhang et al.

It is certified that error appears in the above-identified patent and that said Letters Patent is hereby corrected as shown below:

At Column 2, Line 29, replace "±" with "~".

At Column 5, Line 22, replace "±" with "~".

At Column 5, Line 26, insert paragraph break after the word "value.".

In Claim 6 at Column 8, Line 38, delete the word "of" after the word "tank".

Signed and Sealed this
Fifth Day of March, 2013

Teresa Stanek Rea
*Acting Director of the United States Patent and Trademark Office*